US008649182B2

(12) United States Patent
Ko et al.

(10) Patent No.: US 8,649,182 B2
(45) Date of Patent: Feb. 11, 2014

(54) HOUSING AND METHOD OF FASTENING ELECTRONIC CARD

(75) Inventors: Ping-Yu Ko, New Taipei (TW); Chih-Ping Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 155 days.

(21) Appl. No.: 13/413,602

(22) Filed: Mar. 6, 2012

(65) Prior Publication Data

US 2012/0229996 A1 Sep. 13, 2012

(30) Foreign Application Priority Data

Mar. 11, 2011 (TW) .............................. 100108342 A (51) Int. Cl.
*H05K 5/00* (2006.01)
(52) U.S. Cl.
USPC ............................ 361/755; 361/801; 361/802
(58) Field of Classification Search
USPC ......... 361/730, 741, 747, 752, 755, 756, 758, 361/759, 800–802, 807, 809, 810; 439/62, 439/160, 296, 345, 350, 352, 488, 489
See application file for complete search history.

(56) References Cited

U.S. PATENT DOCUMENTS

| | | | | |
|---|---|---|---|---|
| 5,457,608 A * | 10/1995 | Scholder et al. | ............... | 361/752 |
| 5,673,954 A * | 10/1997 | Gray | ............................. | 294/219 |
| 6,406,312 B1 * | 6/2002 | Heitkamp | ...................... | 439/160 |
| 6,974,914 B2 * | 12/2005 | Taylor et al. | ................... | 174/250 |
| 7,466,561 B2 * | 12/2008 | Dean | .............................. | 361/798 |
| 8,085,552 B2 * | 12/2011 | Takao | ............................ | 361/807 |
| 2009/0180264 A1 * | 7/2009 | Chiang | ........................... | 361/752 |
| 2013/0027855 A1 * | 1/2013 | Ko | ............................ | 361/679.01 |

FOREIGN PATENT DOCUMENTS

| | | |
|---|---|---|
| TW | 313953 | 6/2007 |
| TW | 393134 U1 | 11/2010 |

OTHER PUBLICATIONS

Office Action for related Taiwanese Application No. 100108342 dated May 20, 2013 and its English summary provided by the clients.

* cited by examiner

*Primary Examiner* — Hung S Bui
(74) *Attorney, Agent, or Firm* — Ladas & Parry, LLP (57) ABSTRACT

A housing is usable for positioning selectively a first electronic card having a first locking hole and a second electronic card having a second locking hole, and includes a base plate, a connector for mating with the selected one of the first and second electronic cards, and a movable element including a lever body that has an end portion connected pivotally to the base plate and a third locking hole opposite to the end portion. The lever body is operable to move the third locking hole between a first position, where the third locking hole is aligned with the first locking hole to cooperatively receive a fastener for fastening one of the first and second electronic cards, and a second position, where the third locking hole is aligned with the second locking hole to cooperatively receive the fastener for fastening the other one of the first and second electronic cards.

20 Claims, 13 Drawing Sheets

HOUSING AND METHOD OF FASTENING ELECTRONIC CARD

CROSS-REFERENCE TO RELATED APPLICATION

This application claims priority of Taiwanese Patent Application No. 100108342, filed on Mar. 11, 2011, the disclosure of which is incorporated herein by reference.

BACKGROUND OF THE DISCLOSURE

1. Field of the Disclosure

This disclosure relates to a method of fastening an electronic card and a housing capable of realizing the method, and more particularly to a method employing a movable locking hole for fastening an electronic card and a housing capable of realizing the method.

2. Description of the Related Art

Because notebook computers continue to shrink in size, the usable space inside its housing is relatively reduced.

Further, in response to widespread wireless network and different wireless transmission specifications, an internal portion of the notebook computer is provided with an electronic card that corresponds to the transmission specifications.

Conventionally, since the location of a locking hole inside the housing for receiving a fastener to fasten an electronic card is fixed, only electronic cards having one similar size can be accommodated inside the housing. Hence, the flexibility of the housing for positioning selectively electronic cards having different sizes is low.

SUMMARY OF THE DISCLOSURE

Therefore, an object of the disclosure is to provide a housing and a method that can resolve the aforesaid problem which cannot position selectively electronic cards having different sizes because of the fixed locking hole.

According to one aspect of this disclosure, a housing is usable for positioning selectively first and second electronic cards. The first electronic card has a first locking hole. The second electronic card has a second locking hole. The housing comprises a base plate, a connector disposed in proximity to the base plate for mating with the selected one of the first and second electronic cards, and a movable element including a lever body that has a first end portion connected pivotally to the base plate, and a third locking hole opposite to the first end portion. The lever body is operable to move the third locking hole between a first position, where the third locking hole is aligned with the first locking hole to cooperatively receive a fastener for fastening one of the first and second electronic cards, and a second position, where the third locking hole is aligned with the second locking hole to cooperatively receive the fastener for fastening the other one of the first and second electronic cards.

Further, the base plate includes a plate body and a hole portion provided in the plate body. The first end portion is inserted rotatably into the hole portion.

Further, the hole portion includes a first hole, and a second hole having a diameter larger than that of the first hole and communicating with the first hole. The first end portion includes a shaft section connected to the lever body of the movable element, and a head extending radially from the shaft section. The shaft section is inserted into the hole portion, and is movable between the first and second holes. The head has an outer diameter larger than a hole diameter of the first hole but smaller than a hole diameter of the second hole.

Further, the base plate further includes a first engaging portion and a second engaging portion both provided on the plate body. The movable element further includes a third engaging portion formed on the lever body and facing the base plate. When the third locking hole is at the first position, the third engaging portion engages the first engaging portion, and when the third locking hole is at the second position, the third engaging portion engages the second engaging portion.

Further, the hole portion further includes a constricted section interconnecting the first and second holes. The shaft section has a first cross-sectional width in a first direction and a second cross-sectional width in a second direction that is transverse to the first direction. The first cross-sectional width is smaller than a width of the constricted section. The second cross-sectional width is larger than the first cross-sectional width and the width of the constricted section.

Further, the first and second engaging portions are configured as grooves, and the third engaging portion is configured as a protrusion.

Further, the lever body has a first surface facing the base plate, and a second surface opposite to the first surface. The first end portion is disposed on the first surface. The third locking hole is provided in the second surface.

Further, the movable element further includes a second end portion opposite to the first end portion. The second end portion includes a protruding post connected to the second surface. The third locking hole is an internally threaded hole formed in the protruding post.

According to another aspect of this disclosure, a method of fastening electronic cards having different sizes comprises: providing a movable element on a base plate, the movable element having a locking hole; and moving the movable element to displace the locking hole relative to the base plate to different locations in the base plate, the locations corresponding to locking holes of the electronic cards.

Further, the movable element is pivotally connected to the base plate so as to be rotatable relative to the base plate.

The method further comprises providing a groove and a protrusion on the base plate and the movable element, respectively. When the movable element is rotated to a particular position, the protrusion engages the groove to retain the movable element at the particular position.

The advantage of the disclosure resides in that through the provision of the movable element, the locking hole for receiving a fastener to fasten an electronic card can be altered in position relative to the base plate so as to align with a locking hole of an electronic card that is inserted into the connector and that has a different size. Through this configuration, the flexibility of the base plate for fastening electronic cards having different sizes is enhanced.

BRIEF DESCRIPTION OF THE DRAWINGS

Other features and advantages of the disclosure will become apparent in the following detailed description of the embodiment of the disclosure, with reference to the accompanying drawings, in which.

DETAILED DESCRIPTION OF THE PREFERRED EMBODIMENT

The above-mentioned and other technical contents, features, and effects of this disclosure will be clearly presented from the following detailed description of one embodiment in coordination with the reference drawings.

Figure 1:
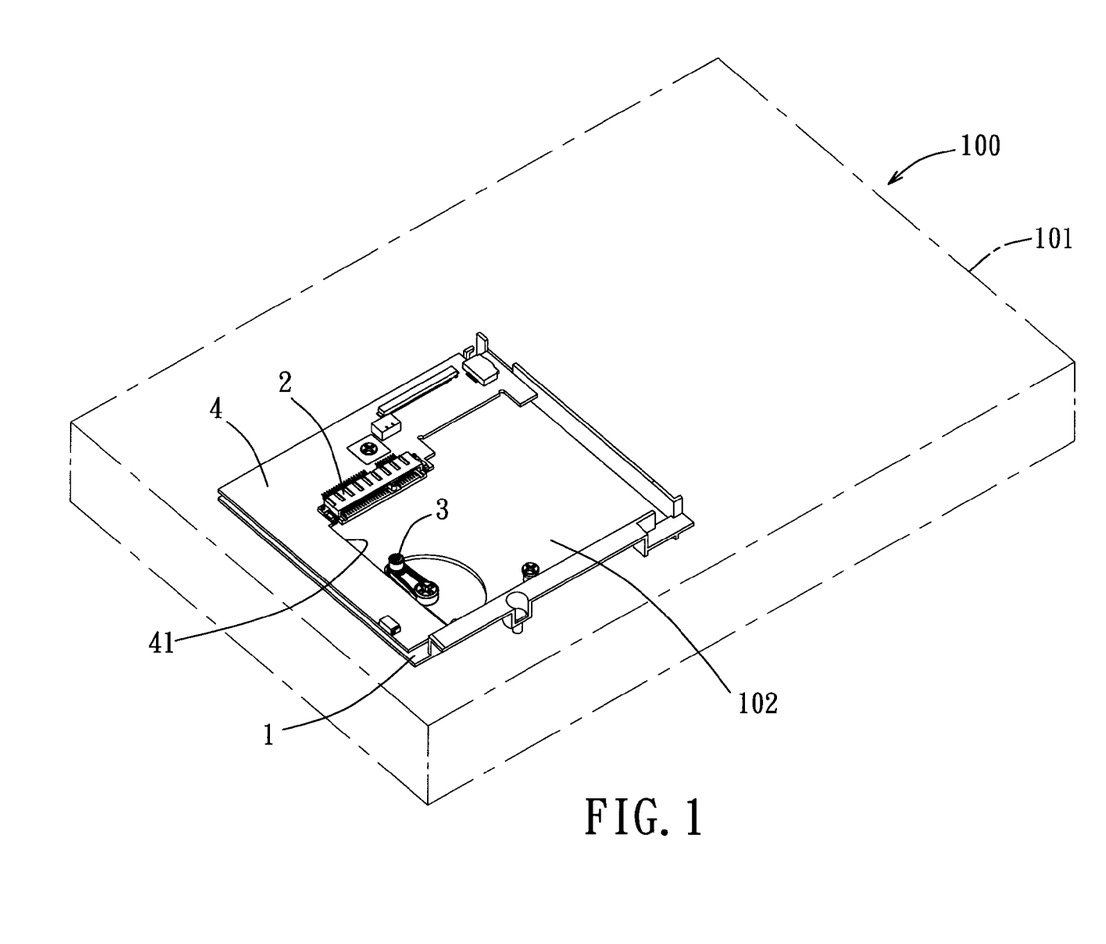
FIG. 1 is a perspective view of a housing according to one embodiment of this disclosure with a housing body thereof shown in imaginary lines.
Figure 2:
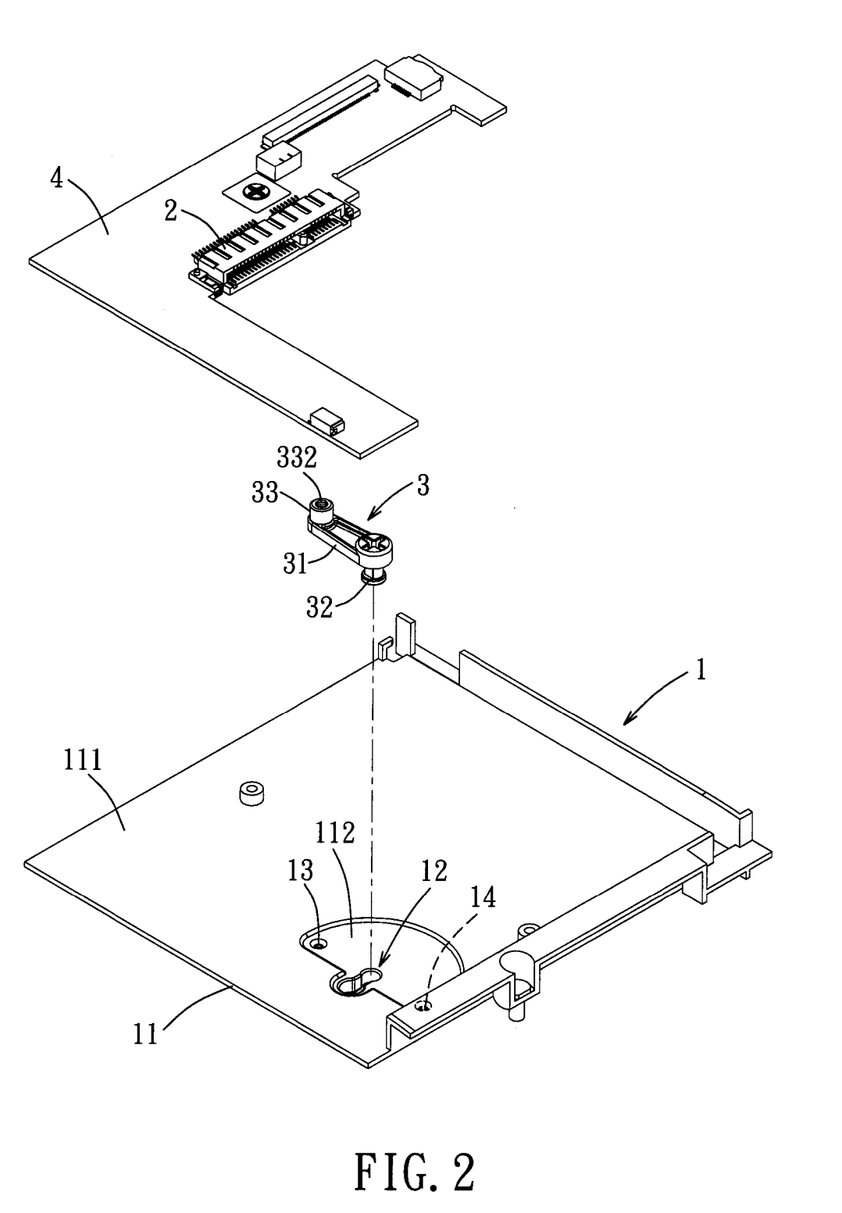
FIG. 2 is a partially exploded perspective view of the embodiment of FIG. 1.
Figure 3:
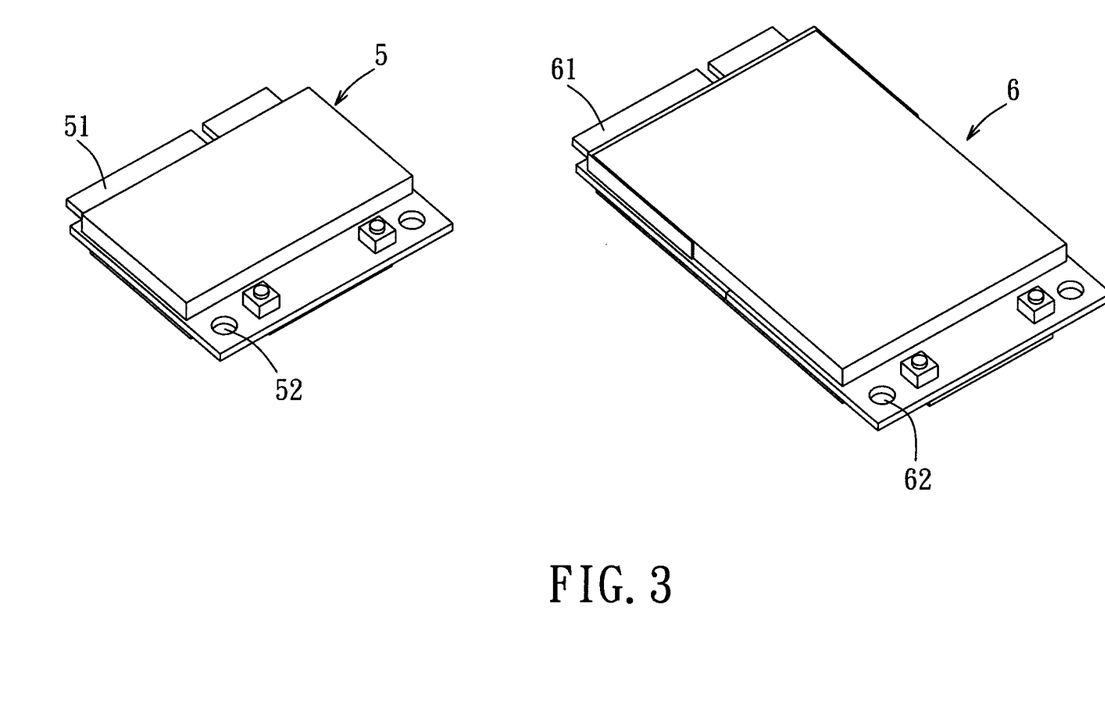
FIG. 3 is a perspective view of a first electronic card and a second electronic card that can be used selectively in the embodiment.

Referring to FIGS. 1 to 3, a housing 100 according to one embodiment of the disclosure comprises a base plate 1, a connector 2, and a movable element 3. The housing 100 of this embodiment is exemplified as a main housing of a notebook computer. The housing 100 further comprises a housing body 101 and a circuit board 4. The housing body 101 (shown in imaginary lines in FIG. 1) defines a receiving space for receiving the base plate 1, the connector 2, the movable element 3, and other electronic components (For example, a motherboard, a hard disk, an interface card, etc.). The base plate 1 may be a portion of the housing body 101 or a circuit board.

The circuit board 4 is disposed above the base plate 1, and is formed with a cutout region 41 to expose a region 102 of the base plate 1. The connector 2 is connected to the circuit board 4 proximate to the cutout region 41 for mating with a selected one of a first electronic card 5 (see FIG. 3) and a second electronic card 6 (see FIG. 3). As such, the first or second electronic card 5, 6 is disposed above the base plate 1.

The first electronic card 5 has a first insert end 51 to be inserted into the connector 2, and a first locking hole 52 formed in an end of the first electronic card 5 that is opposite to the first insert end 51. The second electronic card 6 has a second insert end 61 to be inserted into the connector 2, and a second locking hole 62 formed in an end of the second electronic card 6 that is opposite to the second insert end 61.

Figure 4:
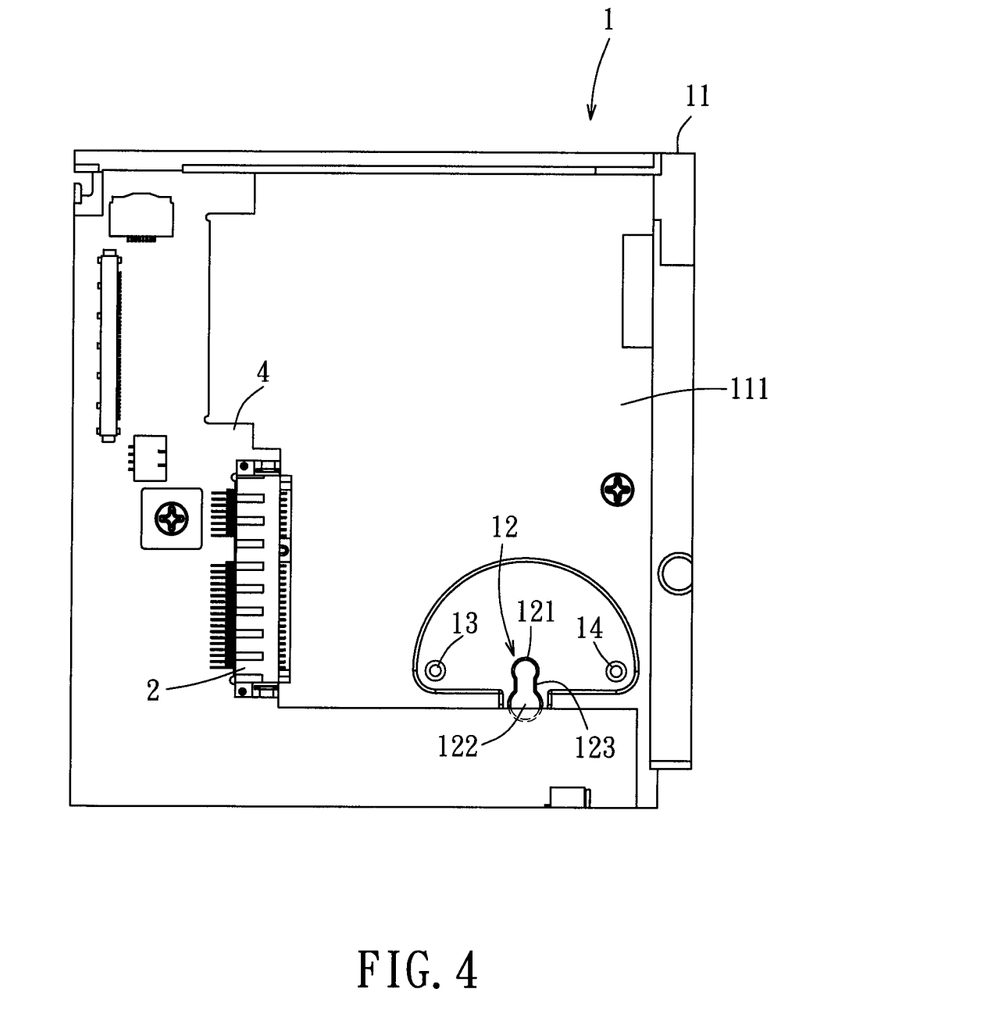
FIG. 4 is a schematic top view of the embodiment in an assembled state.

With reference to FIGS. 2 and 4, the base plate 1 includes a plate body 11, and a hole portion 12, a first engaging portion 13, and a second engaging portion 14 all provided on the plate body 11. In this embodiment, the plate body 11 has a surface 111 facing the circuit board 4. The hole portion 12 extends through the plate body 11, and includes a substantially circular first hole 121, a substantially circular second hole 122, and a constricted section 123 interconnecting the first and second holes 121, 122 such that the first and second holes 121, 122 communicate with each other. The hole portion 12 has a substantially gourd shape. The second hole 122 has a diameter larger than that of the first hole 121. The constricted section 123 has a width smaller than the diameter of each of the first and second holes 121, 122. In this embodiment, the first hole 121, the constricted section 123, and the second hole 122 are arranged in a direction perpendicular to an inserting direction of the first or second electronic card 5, 6 into the connector 2. The first and second engaging portions 13, 14 are configured as grooves that extend inwardly from the surface 111 of the plate body 11. The second engaging portion 14 is farther from the connector 2 than the first engaging portion 13.

Figure 5:
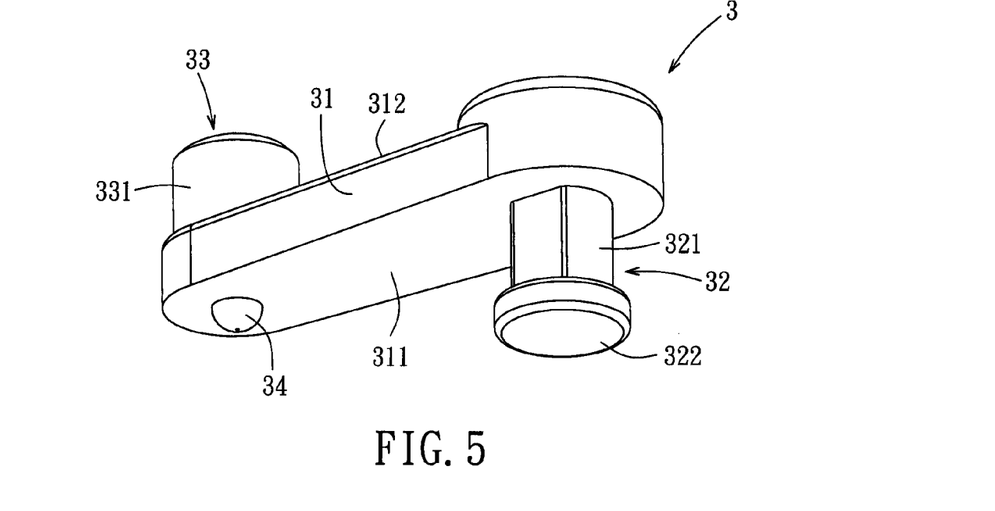
FIG. 5 is an enlarged bottom perspective view of a movable element of the embodiment.
Figure 6:
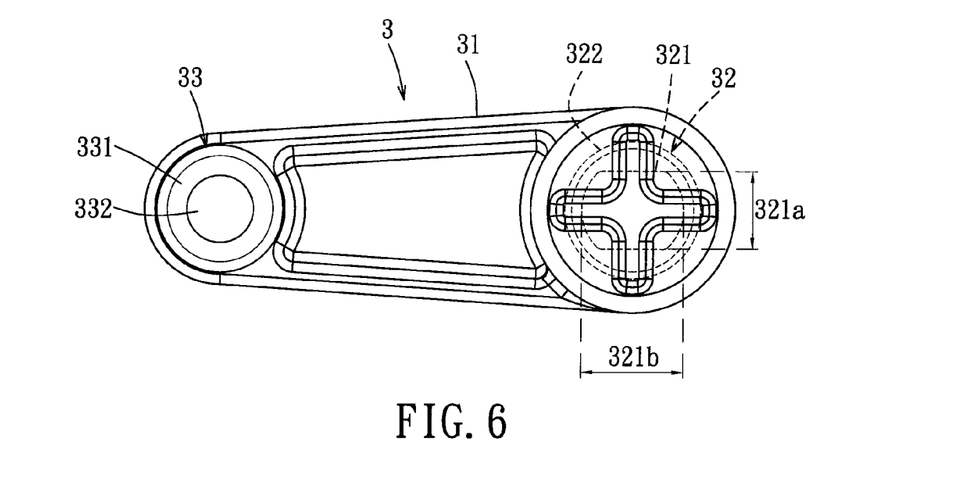
FIG. 6 is a schematic top view of the movable element of FIG. 5.

With reference to FIGS. 2, 5, and 6, the movable element 3 is distal from the connector 2, and includes a substantially elongated lever body 31 having opposite first and second end portions 32, 33 and a third engaging portion 341. The lever body 31 is operable to move the second end portion 33 relative to the plate body 11 by connecting pivotally the first end portion 32 to the base plate 1. That is, the first end portion 32 is inserted rotatably into the hole portion 12 of the base plate 1 so that the second end portion 33 is rotatable about the first end portion 32. Concretely speaking, the lever body 31 has a first surface 311 facing the base plate 1, and a second surface 312 opposite to the first surface 311. The first end portion 32 includes a shaft section 321 connected to the first surface 311, and a head 322 that extends radially from the shaft section 321 and that is distal from the first surface 311. The shaft section 321 is inserted into the hole portion 12, and is movable between the first and second holes 121, 122. The shaft section 321 has a substantially elliptical cross-section. The shaft section 321 has a first sectional width (321a) in a first direction, and a second sectional width (321b) in a second direction transverse to the first direction. The first sectional width (321a) is smaller than the width of the constricted section 123. The second sectional width (321b) is larger than the first sectional width (321a) and the width of the constricted section 123. The head 322 has an outer diameter larger than a hole diameter of the first hole 121 but smaller than a hole diameter of the second hole 122.

The second end portion 33 includes a protruding post 331 connected to the second surface 312, and a third locking hole 332 provided in the protruding post 331. The third locking hole 332 is an internally threaded hole formed in the protruding post 331. The third engaging portion 34 is formed on the lever body 31 facing the base plate 1. Particularly, the third engaging portion 34 is configured as a dome-shaped protrusion that protrudes from the first surface 311 of the lever body 31 corresponding to a bottom side of the second end portion 33.

With reference to FIGS. 2 and 6 to 8, to connect the movable element 3 to the base plate 1, the first end portion 32 is first inserted into the hole portion 12 of the base plate 1. That is, the shaft section 321 is inserted into the second hole 122, and the head 322 extends out of another surface of the plate body 11 that is opposite to the surface 111. Afterwards, the shaft section 321 is moved into the first hole 121 via the constricted section 123, so that the first end portion 32 of the movable element 32 is connected pivotally to the first hole 121 of the hole portion 12. At this time, because the outer diameter of the head 322 is larger than the hole diameter of the first hole 121, the movable element 3 can be prevented from being separated from the plate body 11 along an axial direction of the first hole 121.

Figure 7:
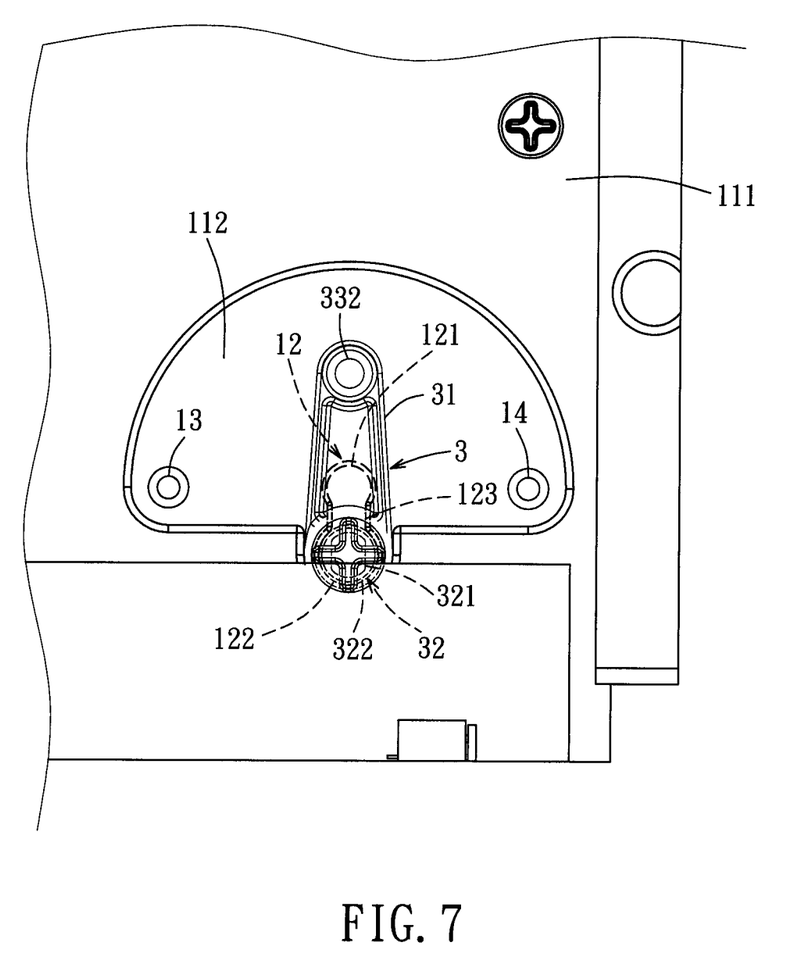
FIG. 7 is a fragmentary schematic top view of the embodiment, illustrating a first end portion of the movable element being inserted into a second hole in the base plate.
Figure 8:
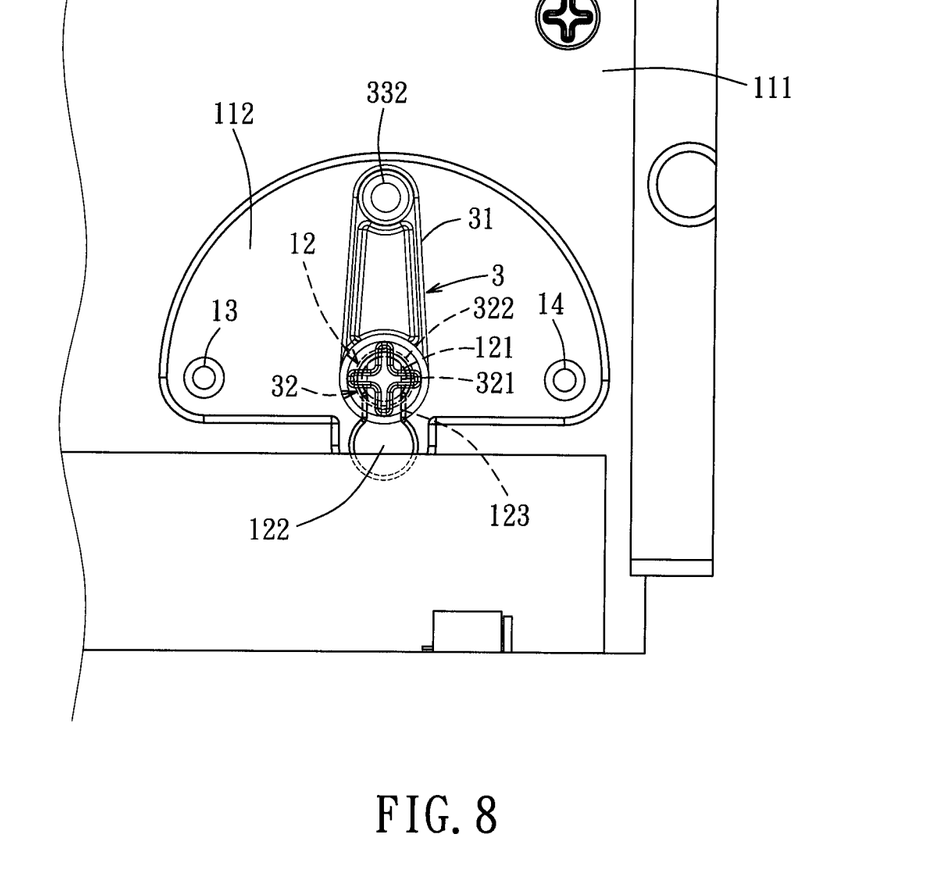
FIG. 8 is a view similar to FIG. 7, but illustrating the first end portion of the movable element being moved to a first hole in the base plate.

It should be noted that because the shaft section 321 has the first sectional width (321a) and the second sectional width (321b), if it is desired to slide the shaft section 321 from the second hole 122 to the first hole 121 through the constricted section 123, the first sectional width (321a) of the shaft section 321 should be disposed in alignment with the constricted section 123. After the shaft section 321 slides into the first hole 121, the lever body 31 is then rotated so that the first sectional width (321a) is disaligned with the constricted section 123, thereby preventing the shaft section 321 from moving to the second hole 122 via the constricted section 123.

In this embodiment, through the structural cooperation of the hole portion 12 and the first end portion 32 of the movable element 3, the movable element 3 can be easily assembled to and disassembled from the base plate 1. Alternatively, the first end portion 32 of the movable element 3 may also be connected pivotally and non-removably to the base plate 1.

Figure 9:
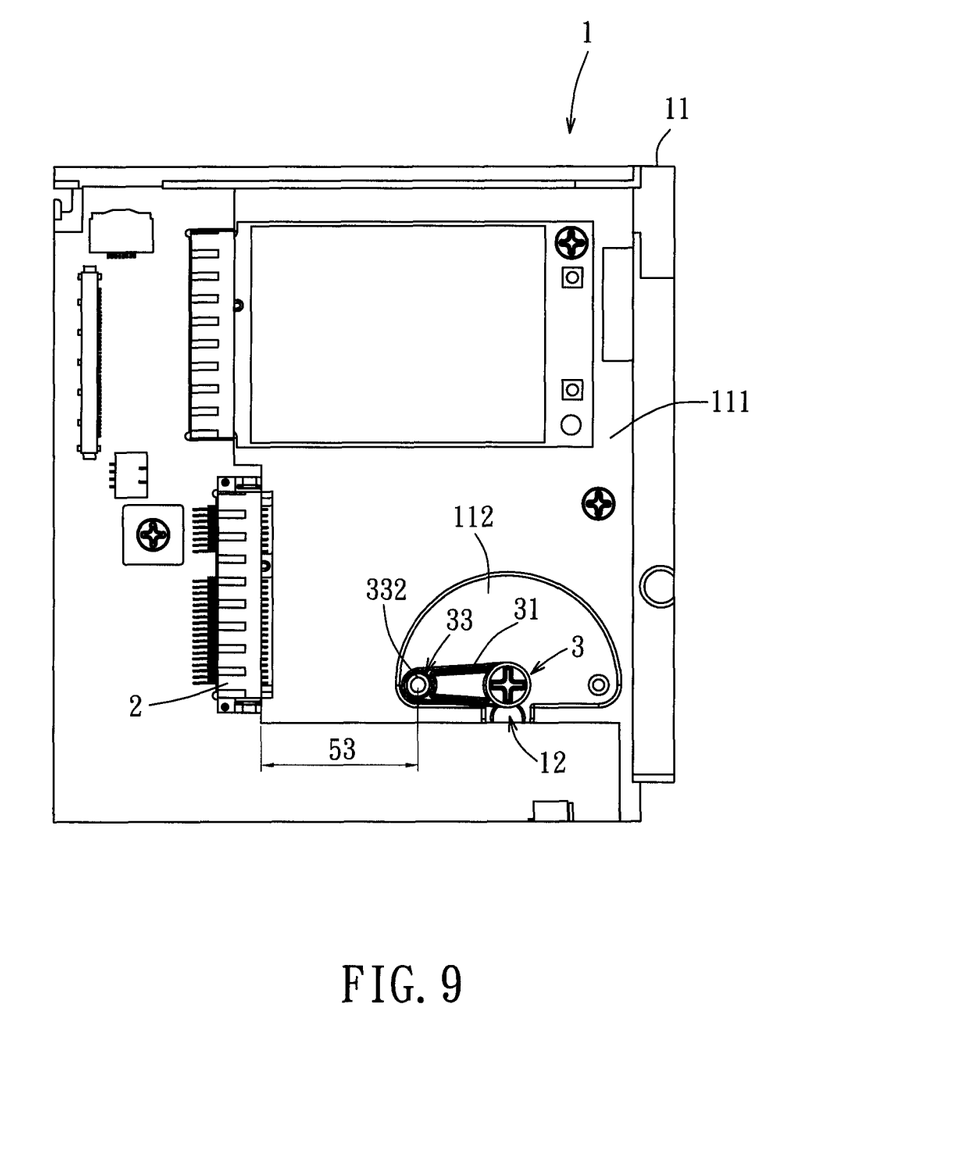
FIG. 9 is a schematic top view of the embodiment, illustrating a third locking hole in the movable element being disposed at a first position.
Figure 10:
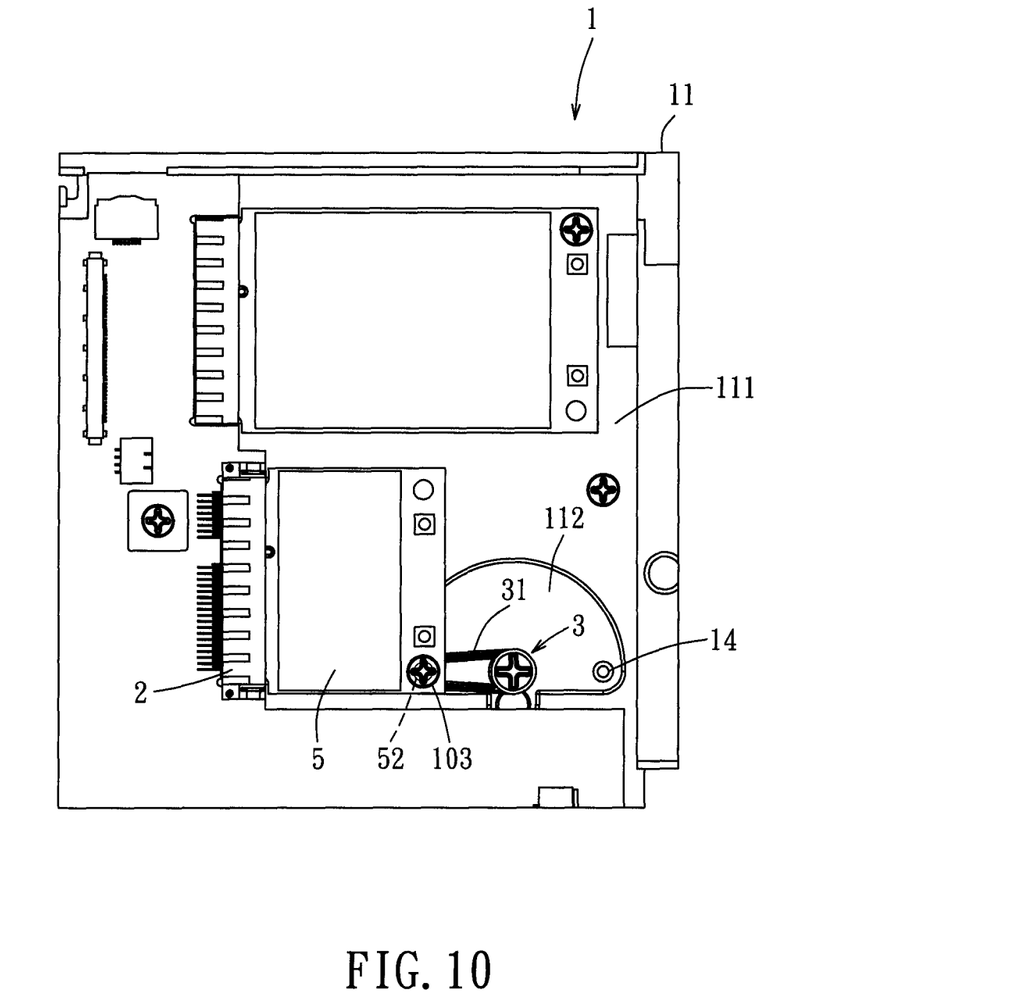
FIG. 10 is a view similar to FIG. 9, but illustrating the first electronic card being inserted into a connector and fastened to the third locking hole which is disposed at the first position.
Figure 11:
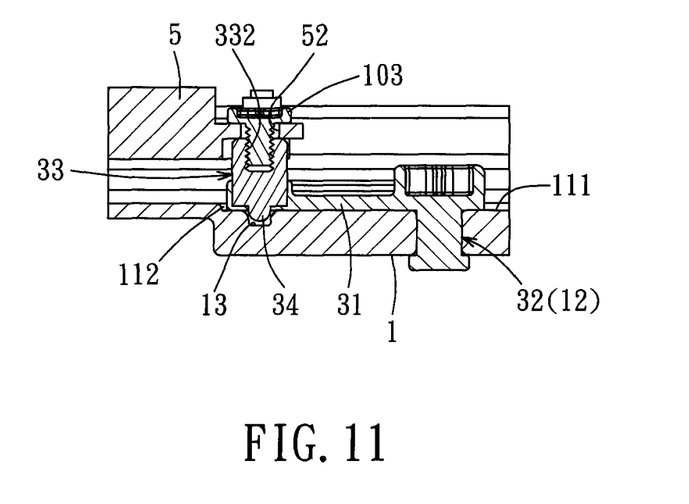
FIG. 11 is a sectional view, illustrating how the first electronic card is fastened to the third locking hole.

With reference to FIGS. 9 to 11, when the connector 2 is to be mated with the first electronic card 5, the movable element 3 is first assembled on the base plate 1, after which the lever body 31 is rotated such that the second end portion 33 is facing the connector 2 and the third locking hole 332 is spaced apart from the connector 2 at a first distance 53. The first distance 53 is exactly the distance of the first locking hole 52 of the first electronic card 5 from the connector 2 when the first electronic card 5 is inserted into the connector 2. Further, the third engaging portion 34 engages the first engaging portion 13, thereby placing the third locking hole 332 at a first position, as shown in FIG. 9. When the first electronic card 5 is mated with the connector 2, the first locking hole 52 is aligned with the third locking hole 332 to cooperatively receive a fastener 103, such as a screw, for fastening the first electronic card 5. At this time, the second end portion 33 is located between the first electronic card 5 and the base plate 1.

Figure 12:
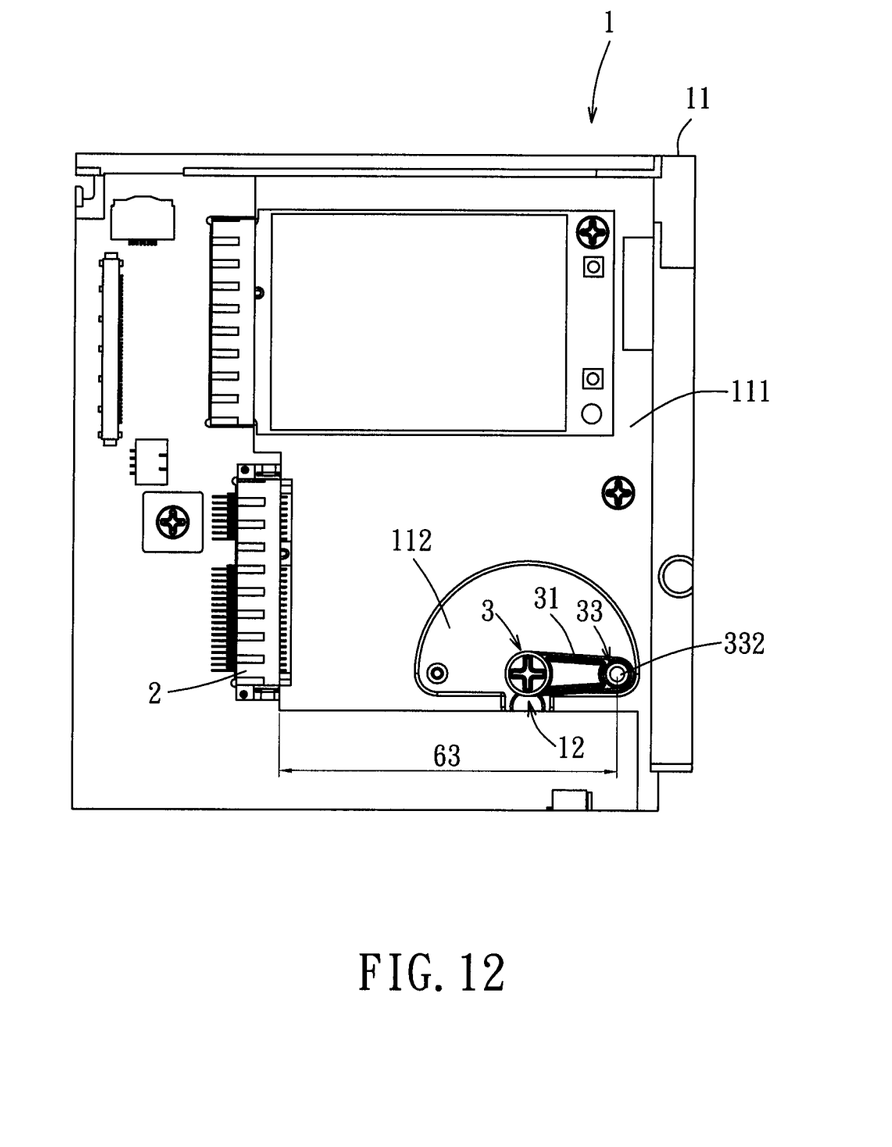
FIG. 12 is a view similar to FIG. 9, but illustrating the third locking hole in the movable element being disposed at a second position.
Figure 13:
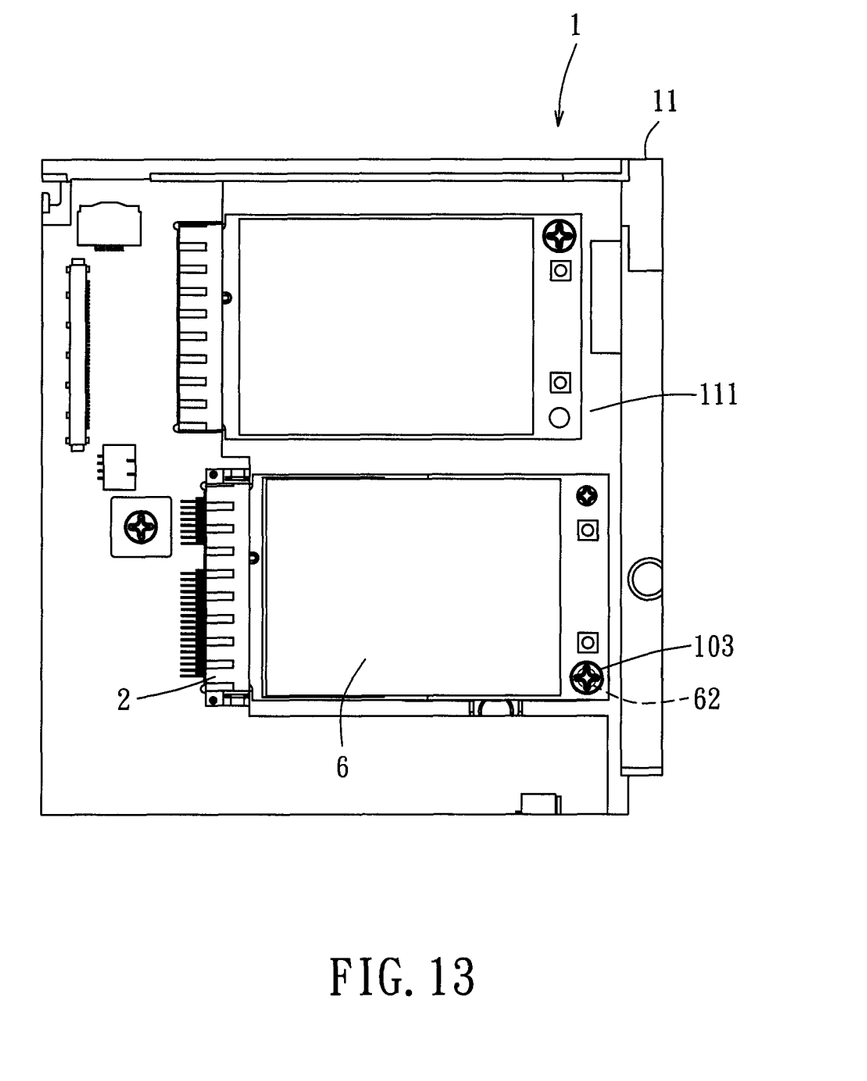
FIG. 13 is a view similar to FIG. 12, but illustrating a second electronic card being inserted into the connector and fastened to the third locking hole which is disposed at the second position.
Figure 14:
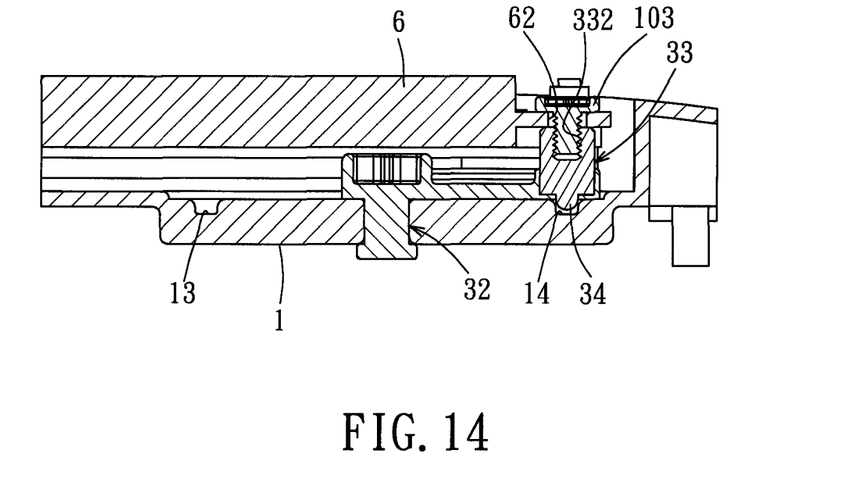
FIG. 14 is a sectional view, illustrating how the second electronic card is fastened to the third locking hole.

With reference to FIGS. 12 to 14, when the connector 2 is to be mated with the second electronic card 6, the movable element 3 is first assembled on the base plate 1, after which the lever body 31 is rotated such that the second end portion 33 is facing a side opposite to the connector 2 and the third locking hole 332 is spaced apart from the connector 2 at a second distance 63. The second distance 63 is exactly the distance of the second locking hole 62 from the connector 2 when the second electronic card 6 is inserted into the connector 2. Further, the third engaging portion 34 engages the second engaging portion 14, thereby placing the third locking hole 332 at a second position, as shown in FIG. 12. When the second electronic card 6 is mated with the connector 2, the second locking hole 62 is aligned with the third locking hole 332 to cooperatively receive the fastener 103 for fastening the second electronic card 6. At this time, the second end portion 33 is located between the second electronic card 6 and the base plate 1.

Preferably, the surface 111 of the plate body 11 of the base plate 1 is formed with a sector-shaped recessed region 112 to restrict rotation of the movable element 3 there within. A space between the base plate 1 and one of the first and second electronic cards 5, 6 is arranged to accommodate the movable element 3 when the first or second electronic card 5, 6 is inserted into the connector 2. Further, the third locking hole 332 is not limited to the aforesaid first and second positions. Because the angular rotation of the movable element 3 can be adjusted according to actual requirement, through cooperation of the movable element 3 with the structural improvement of the base plate 1, the third locking hole 332 can be displaced to different locations in the base plate 1. Each location corresponds to a locking hole of an electronic card.

A method of fastening electronic cards 5, 6 having different sizes on a same region according to the disclosure includes providing the movable element 3 on the base plate 1, and moving the movable element 3 so as to displace the third locking hole 332 relative to the base plate 1 to different locations in the base plate 1. Each location corresponds to the first or second locking hole 52, 62 of the first or second electronic card 5, 6.

Based on the aforesaid housing 100 of this embodiment, because the size of the second electronic card 6 is larger than that of the first electronic card 5, the same region means the region occupies by the second electronic card 6 on the base plate 1 when inserted into the connector 2. When the first electronic card 5 is inserted into the connector 2, it only occupies a portion of said region. Hence, through the movability of the movable element 3, many different types of electronic cards can be positioned on the base plate 1.

Moreover, in this embodiment, through the provision of groove (that is, the first or second engaging portion 13, 14) and protrusion (that is, the third engaging portion 34) on the base plate 1 and the lever body 31, respectively, when the movable element 3 is rotated to a particular position (such as the first or second position of this embodiment), the protrusion engages the groove so as to retain temporarily the movable element 3 at said particular position.

In summary, through the provision of the movable element 3, the locking hole 332 that receives the fastener 103 for fastening one of the electronic cards 5, 6 can be altered in position relative to the base plate 1 so that it can align with the locking hole 52, 62 of the first or second electronic card 5, 6 when the first or second electronic card 5, 6 is inserted into the connector 2. Through this configuration, the flexibility of the base plate 1 for fastening electronic cards having different sizes is enhanced. Hence, the objects of the disclosure can be realized. Thus, during manufacture of the base plate 1, it is not necessary to preform locking hole which can restrict positioning of electronic cards having different sizes.

While the disclosure has been described in connection with what is considered the most practical embodiment, it is understood that this disclosure is not limited to the disclosed embodiment but is intended to cover various arrangements included within the spirit and scope of the broadest interpretations and equivalent arrangements.

We claim:

1. A housing usable for positioning selectively first and second electronic cards, the first electronic card having a first locking hole, the second electronic card having a second locking hole, said housing comprising:
    a base plate;
    a connector disposed in proximity to said base plate for mating with a selected one of the first and second electronic cards; and
    a movable element including a lever body that has a first end portion and a third locking hole opposite to said first end portion, said first end portion being connected pivotally to said base plate, said lever body being operable to move said third locking hole between a first position, where said third locking hole is aligned with said first locking hole to cooperatively receive a fastener for fastening one of the first and second electronic cards, and a second position, where said third locking hole is aligned with said second locking hole to cooperatively receive the fastener for fastening the other one of the first and second electronic cards.

2. The housing as claimed in claim 1, wherein said base plate includes a plate body and a hole portion provided in said plate body, said first end portion being inserted rotatably into said hole portion.

3. The housing as claimed in claim 2, wherein said hole portion includes a first hole, and a second hole having a diameter larger than that of said first hole and communicating with said first hole, said first end portion including a shaft section connected to said lever body of said movable element, and a head extending radially from said shaft section, said shaft section being inserted into said hole portion and being movable between said first and second holes, said head having an outer diameter larger than a hole diameter of said first hole but smaller than a hole diameter of said second hole.

4. The housing as claimed in claim 3, wherein said hole portion further includes a constricted section interconnecting said first and second holes, said shaft section having a first cross-sectional width in a first direction and a second cross-sectional width in a second direction that is transverse to said first direction, said first cross-sectional width being smaller than a width of said constricted section, said second cross-sectional width being larger than said first cross-sectional width and the width of said constricted section.

5. The housing as claimed in claim 2, wherein said base plate further includes a first engaging portion and a second engaging portion both provided on said plate body, said movable element further including a third engaging portion formed on said lever body facing said base plate, wherein, when said third locking hole is at said first position, said third engaging portion engages said first engaging portion, and when said third locking hole is at said second position, said third engaging portion engages said second engaging portion.

6. The housing as claimed in claim 5, wherein said first and second engaging portions are configured as grooves, and said third engaging portion is configured as a protrusion.

7. The housing as claimed in claim 2, wherein said lever body has a first surface facing said base plate, and a second surface opposite to said first surface, said first end portion being disposed on said first surface, said third locking hole being provided in said second surface.

8. The housing as claimed in claim 7, wherein said movable element further includes a second end portion opposite to said first end portion, said second end portion including a protruding post connected to said second surface, said third locking hole being an internally threaded hole formed in said protruding post.

9. The housing as claimed in claim 1, wherein said lever body has a first surface facing said base plate, and a second surface opposite to said first surface, said first end portion being disposed on said first surface, said third locking hole being provided in said second surface.

10. The housing as claimed in claim 9, wherein said movable element further includes a second end portion opposite to said first end portion, said second end portion including a protruding post connected to said second surface, said third locking hole being an internally threaded hole formed in said protruding post.

11. The housing as claimed in claim 1, further comprising a circuit board disposed on said base plate and having a cutout region to expose partially said base plate, said connector being connected to said circuit board proximate to said cutout region, said movable element being distal from said connector and further including a second end portion that is opposite to said first end portion and that has said third locking hole, said second end portion being rotatable about said first end portion.

12. The housing as claimed in claim 11, wherein said base plate includes a plate body and a hole portion provided in said plate body, said first end portion being inserted rotatably into said hole portion.

13. The housing as claimed in claim 12, wherein said hole portion includes a first hole, and a second hole having a diameter larger than that of said first hole and communicating with said first hole, said first end portion including a shaft section connected to said lever body of said movable element, and a head extending radially from said shaft section, said shaft section being inserted into said hole portion and being movable between said first and second holes, said head having an outer diameter larger than a hole diameter of said first hole but smaller than a hole diameter of said second hole.

14. The housing as claimed in claim 13, wherein said hole portion further includes a constricted section interconnecting said first and second holes, said shaft section having a first cross-sectional width in a first direction and a second cross-sectional width in a second direction that is transverse to said first direction, said first cross-sectional width being smaller than a width of said constricted section, said second cross-sectional width being larger than said first cross-sectional width and the width of said constricted section.

15. The housing as claimed in claim 12, wherein said base plate further includes a first engaging portion and a second engaging portion both provided on said plate body, said movable element further including a third engaging portion formed on said lever body facing said base plate, wherein, when said third locking hole is at said first position, said third engaging portion engages said first engaging portion, and when said third locking hole is at said second position, said third engaging portion engages said second engaging portion.

16. The housing as claimed in claim 15, wherein said first and second engaging portions are configured as grooves, and said third engaging portion is configured as a protrusion.

17. The housing as claimed in claim 12, wherein said lever body has a first surface facing said base plate, and a second surface opposite to said first surface, said first end portion being disposed on said first surface, said third locking hole being provided in said second surface; wherein said movable element further includes a second end portion opposite to said first end portion, said second end portion including a protruding post connected to said second surface, said third locking hole being an internally threaded hole formed in said protruding post.

18. A method of fastening electronic cards having different sizes, comprising:
providing a movable element on a base plate, said movable element having a locking hole; and
moving said movable element to displace said locking hole relative to said base plate to different locations in said base plate, said locations corresponding to locking holes of the electronic cards.

19. The method as claimed in claim 18, wherein said movable element is pivotally connected to said base plate so as to be rotatable relative to said base plate.

20. The method as claimed in claim 18, further comprising providing a groove and a protrusion on said base plate and said movable element, respectively, wherein, when said movable element is rotated to a particular position, said protrusion engages said groove to retain said movable element at said particular position.

* * * * *